United States Patent Office 3,093,552
Patented June 11, 1963

3,093,552
SYNTHESIS OF COBAMIDES
David Perlman, Princeton, N.J., assignor to Olin Mathieson Chemical Corporation, New York, N.Y., a corporation of Virginia
No Drawing. Filed Jan. 9, 1962, Ser. No. 165,250
1 Claim. (Cl. 195—114)

This invention relates to the synthesis of cobamides and more particularly to the synthesis of 5,6-dimethylbenzimidazolylcobamides by use of a new class of microorganisms. [As used in this specification, the term "5,6-dimethylbenzimidazolylcobamide" is a generic expression including 5,6-dimethylbenzimidazolylcobamide coenzyme, cyano - 5,6 - dimethylbenzimidazolylcobamide (vitamin $B_{12}$), hydroxo-5,6-dimethylbenzimidazolylcobamide, and other salts thereof.]

Prior to this invention, various microorganisms were known which would yield 5,6-dimethylbenzimidazolylcobamides when cultured in a suitable nutrient medium under specified conditions. One condition required in all such known processes was that somewhere in the process an aeration step was necessary. Certain microorganisms, which are aerobic by nature, required aeration during hte fermentation steps; others, and especially the Propionibacterium species including *P. shermanii*, *P. freudenreichii* and *P. technicum* could be cultured under anaerobic conditions, but a subsequent aeration step was necessary in order to produce any appreciable amount of 5,6-dimethylbenzimidazolylcobamide. The disadvantages of such aeration steps are manifest. In addition to requiring specialized equipment, aeration was often accompanied by foaming and, therefore, the process had to be carefully controlled. The alternative, that of adding 5,6-dimethylbenzimidazole to cultures of Propionibacterium species, e.g., *P. arabinosum*, *P. petersonii*, *P. zeae*, is expensive since this material is not commercially available.

It has now been found that 5,6-dimethylbenzimidazolylcobamide can be prepared under totally anaerobic conditions by the process of this invention, which essentially comprises culturing a microorganism of the genus Butyribacterium under anaerobic conditions and recovering the 5,6-dimethylbenzimidazolylcobamide formed. Among the suitable microorganisms which can be employed in the process of this invention may be mentioned *Butyribacterium rettgeri*.

The nutrient medium useful in the process of this invention must include sources of assimilable carbon, nitrogen and cobalt. As sources of assimilable carbon, there may be used: (1) carbohydrates, such as glucose, fructose, sucrose, maltose, dextrins and soluble starches; (2) substances containing carbohydrates, such as corn steep liquor and grain mashes; (3) fats, such as lard oil, soybean oil, linseed oil, cottonseed oil, peanut oil, coconut oil, corn oil, castor oil, sesame oil, crude palm oil, mutton tallow, sperm oil, olive oil, tristearin, triolein and tripalmitin; and (4) faty acids having more than fourteen carbon atoms, such as stearic acid, palmitic acid, oleic acid, linoleic acid and myristic acid.

Sources of available nitrogen include: (1) organic nitrogen compounds, such as proteinaceous materials, e.g., soybean meal, fish meal, casein, whey or whey concentrates, liver cake, yeast extract, and peptone; and (2) inorganic compounds, such as nitrates and ammonium compounds.

Assimilable cobalt may be supplied to the nutrient medium in a variety of forms. It may be provided in the form of cobalt salts, such as cobalt chloride and cobalt nitrate; or it may be provided in the form of organically-bound cobalt, such as a cobalt-containing yeast, preferably one containing a relatively high proportion of cobalt.

The fermentation process of this invention may be carried out at temperatures from about 20° C. to about 46° C., with a temperature of about 30° C. to 37° C. being preferred. Since acids are formed as by-products during the fermentation, a base, such as ammonium hydroxide, is preferably added intermittently during the fermentation to neutralize the acids as they are formed.

The following examples illustrate the process of this invention (all temperatures being in centigrade):

Example 1

One liter of the following sterile medium:

| | |
|---|---:|
| Cornsteep liquor (neutralized to pH 7.0 with sodium hydroxide) ml | 60 |
| Glucose g | 40 |
| $Co(NO_3)_2 \cdot 6H_2O$ g | 0.025 |
| $CaCO_3$ (powder, sterilized separately) g | 20 | is added to an Erlenmeyer flask and inoculated with 50 ml. of a 2-day old vegetative culture of *Butyribacterium rettgeri* (ATCC 10825; American Type Culture Collection, Washington, D.C.) grown in a cornsteep liquor-glucose medium. The inoculated medium is incubated at 37°. Sterile ammonium hydroxide is added daily to neutralize acids formed and bring the pH to 6.8 to 7.2. An additional 40 g. of glucose (dissolved in 100 ml. of water) is added to the fermentation after 72 hours' incubation. Samples are removed at the end of 4 and 6 days' incubation, diluted with an equal volume of 95% ethanol and heated for 15 minutes at 95° in a water bath. The samples are then centrifuged and the supernatant liquid assayed for the presence of cobamides by conventional procedures. The total cobamide content is about 3 γ/ml. after four days' incubation and 5 γ/ml. after six days (by bioassay using *Lactobacillus leichmanii* with 5,6-dimethylbenzimidazolylcobamide cyanide as a standard). The only cobamide present is 5,6-dimethylbenzimidazolylcobamide coenzyme as determined by filter paper chromatography and ionophosis.

The coenzyme can be converted to vitamin $B_{12}$ (cyanocobalamin) by conventional methods, as by treatment with potassium cyanide or a source of cyanide ions; or to hydroxo-5,6-dimethylbenzimidazolylcobamide by conventional methods, as by treatment with acid or exposure to light.

Example 2

Following the procedure of Example 1 but substituting 10 g. of yeast extracted and 20 g. of peptone for the cornsteep liquor, the bioassays are about 2.5 γ/ml. and about 4 γ/ml. after four and six days' incubation, respectively.

The invention may be variously otherwise embodied within the scope of the appended claim.

What is claimed is:

A process for preparing 5,6-dimethylbenzimidazolylcobamides, which comprises culturing the microorganism *Butyribacterium rettgeri* in a nutrient medium, said medium having included therein a source of assimilable carbon, nitrogen and cobalt under anaerobic conditions and recovering the 5,6-dimethylbenzimidazolylcobamide formed.

References Cited in the file of this patent

UNITED STATES PATENTS 2,715,602   Hargrove et al. _____ Aug. 16, 1955

OTHER REFERENCES

Bergey's Manual of Determinative Bacteriology, seventh edition, 1957, pp. 570–577.